United States Patent Office 3,547,919
Patented Dec. 15, 1970

3,547,919
PROCESSING OFFGAS FROM THE SYNTHESIS OF MELAMINE
Guenther Hamprecht, Munich, Germany, assignor to Badische Anilin- & Soda-Fabrik Aktiengesellschaft, Ludwigshafen, Germany, a company of Germany
No Drawing. Filed Nov. 8, 1968, Ser. No. 774,514
Claims priority, application Germany, Nov. 11, 1967, 1,670,286
Int. Cl. C07d 55/28
U.S. Cl. 260—249.7     5 Claims

ABSTRACT OF THE DISCLOSURE

In order to separate melamine from reaction gas such as is obtained in the thermal treatment of urea in the presence of catalysts, the offgas is cooled to temperatures of 150° to 220° C. by direct cooling with ammonia, the deposited melamine is separated and the gas cooled to from −35° to +60° C. by mixnig it with further ammonia. Ammonium carbamate is thus deposited and this is separated from the gas which consists of practically pure ammonia.

---

It is known that urea can be reacted in the presence of added ammonia and catalysts at atmospheric or superatmospheric pressure and at temperatures of from 320° to 450° C. to form melamine. As a rule about 2 to 5 cubic meters (STP) of amonia has to be used for each kilogram of urea. In this way an offgas is obtained which contains (in addition to 1 mole of melamine) 6 moles of ammonia and 3 moles of carbon dioxide together with the added ammonia, in accordance with the equation:

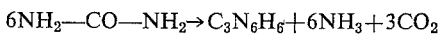

$$6NH_2—CO—NH_2 \rightarrow C_3N_6H_6 + 6NH_3 + 3CO_2$$

Melamine is condensed out from this offgas by cooling to temperatures of 150° to 250° C. In a further cooling stage, unreacted urea which has been removed from the reaction zone with the offgas can be condensed out and this is usually effected by cooling to temperatures of from 120° to 140° C.

An offgas is thus obtained which consists essentially of ammonia, carbon dioxide and small amounts of inert gases. Its content of carbon dioxide is a considerable handicap to its further use.

It is true that this offgas can, after reheating, be returned to the reactor as fluidizing gas. A high content of carbon dioxide however interferes with the conversion of urea to melamine and moreover the cooling and reheating of large amounts of gas is uneconomical.

It is known from U.S. patent specification No. 3,310,558 that in order to separate excess ammonia from this offgas it may be washed in a column with water so that almost the whole of the carbon dioxide and some of the ammonia are absorbed. Ammonia containing water vapor is obtained which has to be dried for example prior to reuse as fluidizing gas in the melamine reactor. This is carried out for example by cooling the gas mixture in condensers to temperatures down to −6° C. As regards energy consumption, the said method is very expensive for this reason.

It is also known from U.S. patent specification 2,950,173 that ammonia can be separated from the offgas from melamine synthesis by treatment with an anhydrous solvent, for example dimethylformamide, ethylene glycol or diethylene glycol, a suspension of ammonium carbamate being obtained in the solvent at the same time. The temperature of the solvent is kept at from 0° to 20° C. The ammonium carbamate is separated from the solvent and split by heating it to about 100° C. into ammonia and carbon dioxide from which solvent residues (which have been entrained with the moist carbamate) have to be removed. Furthermore brine has to be used for cooling the liquid.

It is an object of the present invention to provide a simple process for the separation of melamine from offgas obtained in the synthesis of melamine from urea at elevated temperature in the presence of added ammonia and a catalyst. It is a special object of the present invention to provide a project for the separation of melamine from fluid offgas and for the further separation of practically pure ammonia from the offgas freed from melamine which process does not have the said disadvantages.

We have found that these objects are achieved in a method of processing offgas obtained in the synthesis of melamine by the reaction of urea at elevated temperature in the presence of added ammonia and a catalyst and separation of melamine by cooling the offgas to a temperature of from 150° to 250° C. by mixing it with colder gas, by carrying out separation of melamine with or without urea from the offgas by direct cooling with ammonia and cooling the offgas with more ammonia to a temperature of from −35° to +60° C. and separating the ammonium carbamate thus precipitated from the gas consisting of practically pure ammonia.

For the separation of melamine, urea and ammonium carbamate it is advantageous to use ammonia at a temperature of from −30° to +30° C. In order that the amount of gas should not become to great, it is advantageous to use liquid ammonia so that the heat of evaporation of the ammonia may be utilized for cooling the gas in the individual stages. Naturally it is also possible to introduce liquid and gaseous ammonia simultaneously. According to a preferred embodiment of the present invention liquid ammonia is injected in fine dispersion into the individual cooling zones by means of gaseous ammonia and thus rapid and intense mixing of the cooling medium with the offgas to be cooled is effected.

Treatment of offgas in accordance with this invention may be carried out at atmospheric or superatmospheric pressure. It is advantageous to carry out the treatment at the pressure at which reaction of urea to melamine is carried out, i.e. at pressures up to about 10 atmospheres.

In the last cooling stage in which separation of ammonium carbamate is carried out, temperatures of from −35° to +60° C., preferably from −10° to +45° C., are maintained.

The ammonium carbamate is obtained in a form in which it can be easily sepaarted from the gas. It may be further processed in any way, for example reacted with sulfuric acid or nitric acid to form ammonium sulfate or ammonium nitrate. Naturally it may also be used in the synthesis of urea. In this case it is not necessary to cool the offgas to temperatures of 100° to 150°, preferably from 120° to 135° C., after separation of melamine for the purpose of removing urea, but the offgas which has been freed from melamine may be cooled direct to temperatures of from −35° to +60° C. so that unreacted urea separates together with the ammonium carbamate and can be supplied direct to the urea synthesis.

The gas free from ammonium carbamate consists of practically pure ammonia which is contaminated with only a small amount of carbon dioxide. This gas is advantageously returned to the melamine reactor. This provides the advantage that the amount of ammonia to be used for the synthesis can be kept small and that in the long term only such an amount of ammonia has to be used as is required to cover the ammonia loss. The method has the advantage over the return of off gas freed only from melamine and containing considerable amounts of carbon dioxide, that it is not necessary to circulate and heat and cool large amounts of gas. Thus, it is possible to prepare melamine from urea with the minimum amount of additional ammonia.

The invention is illustrated by the following examples.

EXAMPLE 1

Aluminum oxide having a particle diameter of from 0.07 to 0.5 mm. is fluided in a fluidized-bed reactor by introducing per hour 572 cubic meters (STP) of ammonia gas which has been preheated to 550° C. A temperature of 348° to 350° C. is maintained in the fluidized bed. 300 kg. of fused technical urea having a water content of 0.5% by weight is introduced per hour into the fluidized bed and converted therein to the extent of 98.5% into melamine, ammonia and carbon dioxide.

Entrained fine catalyst dust is first separated from the hot reaction gas. The purified stream of gas is cooled to 330° C. in a cooler and then cooled to a mean temperature of 200° C. by mixing it with 775 kg. of gaseous ammonia which is at 30° C. About 100 kg. per hour of very pure melamine is separated from the stream of gas.

After the melamine has been separated, the reaction gas at 200° C. is mixed with 924 kg. of ammonia gas at 30° C. so that a mean temperature of 135° C. is set up. 5 kg. of unreacted urea is thus deposited. This is separated in a countercurrent scrubber and returned to the melamine reaction.

772 kg. of liquid ammonia at 30° C. is injected into the gas which has thus been practically freed from melamine and urea. 191 kg. of ammonium carbamate separates out at a pressure of 1 atmosphere absolute and the temperature of 30° C. which is set up. The ammonia freed from carbamate by means of gas filters contains less than 0.1% by volume of carbon dioxide.

572 cubic meters (STP), i.e., 440 kg., of this ammonia is compressed, heated to 550° C. and again introduced into the reactor as fluidizing gas. Another 1699 kg. of ammonia gas again serves (after it has been compressed to 1.1 atmospheres absolute and cooled to +30° C.) for the separation of melamine and urea. The remaining 775 kg. of ammonia gas is compressed to 12 to 15 atmospheres absolute and cooled to +30° C. in a pressure cooler to form liquid ammonia which serves again for separating ammonium carbamate.

The small amount of cracked gas (mainly nitrogen and hydrogen) which gradually accumulates in continuous operation is regularly discharged. The resulting loss of ammonia is made up by supplying fresh ammonia gas.

EXAMPLE 2

300 kg. per hour of technical urea containing 0.05% by weight of water is evaporated in a melamine reactor with 440 kg. of ammonia as fluidizing gas and converted to the extent of 98.0% into melamine at 350° C. The offgas is filtered hot to remove entrained fine particles of catalyst dust, precooled in a tubular cooler to 330° C. and cooled to 180° C. by adding 217 kg. of liquid finely divided ammonia at 30° C., 100 kg. per hours of commercially uure melamine being desublimed and separated from the gas by means of electrofilters.

583 kg. of finely divided liquid ammonia is sprayed at a temperature of 30° C. into the gas freed from melamine so that a temperature of 30° C. is set up. 190 kg. of ammonium carbamate and 6 kg. of urea are obtained per hour. The mixed product is separated from the gas by means of porous filters and can be worked up into urea.

The gas remaining is practically pure ammonia, of which 440 kg. per hour is compressed to 1.3 atmospheres absolute, heated to 560° C. and returned to the reactor. The remaining 800 kg. of ammonia is compressed until it can be liquefied at 30° C. and serves again as cooling gas for the offgas after it has been replenished with fresh liquid ammonia.

I claim:

1. A process for processing offgas obtained in the synthesis of melamine by reaction of urea at elevated temperature in the presence of added ammonia and catalysts and separation of the melamine by cooling the offgas to temperatures of from 150° to 250° C. by mixing it with colder gas, wherein separation of melamine with or without urea from the offgas is carried out by direct cooling with ammonia and the offgas is then cooled to temperatures of from −35° to +60° C. by mixing with more ammonia and the ammonium carbamate thus obtained is separated from the gas which consists of practically pure ammonia.

2. A process as claimed in claim 1 wherein the ammonia has a temperature of from −30° to +30° C.

3. A process as claimed in claim 1 wherein after the melamine has been separated, the gas is cooled by mixing with more ammonia to a temperature of 100° to 150° C. to separate urea.

4. A process as claimed in claim 1 wherein the offgas is cooled to from −10° to +45° C. to separate ammonium carbamate.

5. A process as claimed in claim 1 wherein the ammonia separated is returned to the melamine synthesis.

References Cited

UNITED STATES PATENTS 3,336,310   8/1967   Hamprecht et al. __ 260—249.7
3,458,511   7/1969   Hamprecht et al. __ 260—249.7

HENRY R. JILES, Primary Examiner

J. M. FORD, Assistant Examiner